United States Patent
Bree (10) Patent No.: US 9,951,536 B2
(45) Date of Patent: Apr. 24, 2018

(54) FRAMELESS TEMPORARY OR EMERGENCY SHELTER

(71) Applicant: Charles Caulder Bree, Mercer (NZ)

(72) Inventor: Charles Caulder Bree, Mercer (NZ)

( * ) Notice: Subject to any disclaimer, the term of this patent is extended or adjusted under 35 U.S.C. 154(b) by 0 days.

(21) Appl. No.: 15/127,796

(22) PCT Filed: Mar. 20, 2015

(86) PCT No.: PCT/NZ2015/000017
§ 371 (c)(1),
(2) Date: Sep. 21, 2016

(87) PCT Pub. No.: WO2015/142189
PCT Pub. Date: Sep. 24, 2015

(65) Prior Publication Data
US 2017/0096825 A1    Apr. 6, 2017

(30) Foreign Application Priority Data

| Mar. 21, 2014 | (NZ) | ......................................... | 622789 |
| May 15, 2014 | (NZ) | ......................................... | 625056 |
| Jun. 11, 2014 | (NZ) | ......................................... | 626151 |
| Sep. 11, 2014 | (NZ) | ......................................... | 631076 |
| Nov. 24, 2014 | (NZ) | ......................................... | 702243 |

(51) Int. Cl.
*E04H 1/12*     (2006.01)
*E04B 1/344*    (2006.01)
(Continued)

(52) U.S. Cl.
CPC ......... *E04H 1/1205* (2013.01); *A01K 1/0035* (2013.01); *B29C 33/60* (2013.01); *B29C 45/14336* (2013.01); *B29C 45/14795* (2013.01); *B29C 45/14811* (2013.01); *B29C 45/1679* (2013.01); *B29C 45/40* (2013.01); *E04B 1/3445* (2013.01); *E04B 1/34357* (2013.01);
(Continued)

(58) Field of Classification Search
CPC ....... E04H 15/24; E04H 3/126; E04H 15/008; E04H 15/02; A01K 1/0035; B29L 2025/00
See application file for complete search history.

(56) References Cited

U.S. PATENT DOCUMENTS

| 6,496 | A | * | 6/1849 | Dow | ....................... | E04H 15/24 |
| | | | | | | 135/100 |
| 490,680 | A | * | 1/1893 | Ellwood | ................ | B65D 5/008 |
| | | | | | | 229/116 |

(Continued)

FOREIGN PATENT DOCUMENTS

| JP | 06042227 A | * | 2/1994 | |
| KR | 1634557 B1 | * | 6/2016 | |
| WO | WO 2012079165 A1 | * | 6/2012 | ............... E04H 9/10 |

*Primary Examiner* — Babajide A Demuren
(74) *Attorney, Agent, or Firm* — Mark M. Friedman (57) ABSTRACT

A foldable, frameless emergency shelter is constructed from a radial array of bendable yet rigid panels such as of a foamed plastic. Panels have adjoining edges with matching convexly curved profiles. The edges are always held to each other with a flexible fastener such as an adhesive tape. During erection, a flat panel inherently deforms into a curved cylindrical tapered shape enclosing a space. A door and an optional floor are provided. The shelter has a rigid conical cap including holes for guy ropes, a door and an optional window.

13 Claims, 7 Drawing Sheets

(51) Int. Cl.
  *E04B 1/343*   (2006.01)
  *E04H 9/16*    (2006.01)
  *A01K 1/00*    (2006.01)
  *B29C 33/60*   (2006.01)
  *B29C 45/14*   (2006.01)
  *B29C 45/16*   (2006.01)
  *B29C 45/40*   (2006.01)
  *E04H 15/24*   (2006.01)
  *B29K 75/00*   (2006.01)
  *B29K 105/04*  (2006.01)
  *B29L 9/00*    (2006.01)
  *B29L 31/10*   (2006.01)
  *E04H 15/00*   (2006.01)
  *B29L 25/00*   (2006.01)
  *E04H 3/12*    (2006.01)

(52) U.S. Cl.
  CPC .............. *E04H 9/16* (2013.01); *E04H 15/24* (2013.01); *B29K 2075/02* (2013.01); *B29K 2105/04* (2013.01); *B29L 2009/005* (2013.01); *B29L 2025/00* (2013.01); *B29L 2031/10* (2013.01); *E04H 3/126* (2013.01); *E04H 15/008* (2013.01)

(56)  References Cited

U.S. PATENT DOCUMENTS

| | | | | |
|---|---|---|---|---|
| 2,302,650 A * | 11/1942 | Anderson | E04H 15/00 | 135/100 |
| 2,754,550 A * | 7/1956 | Johnson et al. | E04B 1/344 | 135/100 |
| 2,965,376 A * | 12/1960 | Kessler | A63F 9/0204 | 273/338 |
| 3,016,115 A * | 1/1962 | Harrison | E04B 1/34378 | 135/87 |
| 3,346,998 A * | 10/1967 | Nelson | E04B 1/32 | 428/12 |
| 3,662,807 A * | 5/1972 | Miller | G09F 15/0068 | 160/135 |
| 3,714,749 A * | 2/1973 | Aitken | E04B 1/34378 | 52/70 |
| 4,041,671 A * | 8/1977 | Nicholson | E04B 1/166 | 52/2.15 |
| 4,068,421 A * | 1/1978 | Marovich | A01G 9/1407 | 47/17 |
| 4,462,145 A * | 7/1984 | Schulze | E01F 9/688 | 116/63 T |
| 4,672,779 A * | 6/1987 | Boyd | E04H 1/1205 | 52/71 |
| 4,951,432 A * | 8/1990 | Wilkinson | E04B 1/3211 | 52/79.5 |
| 5,319,400 A * | 6/1994 | Herbert | G03B 21/132 | 353/120 |
| 5,803,146 A * | 9/1998 | Boon | E04B 2/7416 | 160/135 |
| 5,809,989 A * | 9/1998 | Nelson | A62C 3/00 | 126/25 R |
| 6,294,248 B1 * | 9/2001 | Madan | B29C 44/14 | 264/255 |
| 8,429,858 B1 * | 4/2013 | Robinson | E04H 1/005 | 135/159 |
| 2002/0083654 A1 * | 7/2002 | Bini | E04B 1/344 | 52/66 |
| 2005/0108955 A1 * | 5/2005 | Howe | E04H 15/008 | 52/79.5 |
| 2008/0066393 A1 * | 3/2008 | Sorensen | A63H 33/101 | 52/81.1 |
| 2009/0014044 A1 * | 1/2009 | Hartman | E04B 1/3445 | 135/143 |

* cited by examiner

FRAMELESS TEMPORARY OR EMERGENCY SHELTER

FIELD

This invention relates to shelters for people, used as temporary or emergency accommodation. The invention provides light-weight and easily transported shelters. The invention is also suitable for use as a shelter for new-born farm animals in stormy weather or in snow.

DEFINITIONS

A panel that is described herein as "rigid yet capable of being bent" is one that has a fixed mean length and a fixed mean width, but is sufficiently flexible in one axis to be bent into a curve extending up to about a quarter of a circle in one direction, with a radius of typically about 2.5 meters.

The term "convex curved edge" as applied herein to a side panel describes a curve along an edge of a panel between a first corner and a second adjacent corner; the edge extending outward from the interior of the panel beyond a line joining the first and the second corner. The preferred curve is an arc of a circle, or other curves including without limitation portions of a parabola or of a hyperbola.

As used herein the term "frameless dwelling" means a dwelling made from wall panels that have sufficient rigidity that, when the wall panels are duly attached along curved joints, the building thus formed does not require a frame.

BACKGROUND

From time to time there is a need to provide an emergency shelter which provides interim housing for purposes such as disaster relief or for refugees; in some cases for many years of use. If the shelter was stackable and light in weight, many shelter units can be transported to a site by airlift, and perhaps parachuted or simply dropped into a location. Storage is facilitated if the shelters are stackable. The qualities of a shelter include a balance between lightness and cheapness (hence availability) on the one hand, security and protection (such as insulation from wind, rain, snow or extremes of temperature) on the other hand, and always livability.

PRIOR ART

Many forms of emergency or temporary housing are known, including tents, Nissen huts, portable caravans, modified shipping containers, and huts made from locally available materials including roofing materials and canvas. Molloy (WO98/32935) describes a frameless pyramidal dwelling made from a plurality of substantially planar wall panels of preferably waterproofed cardboard and in one example there are 8 panels. Each panel has the shape of an isosceles trapezium; defined as having straight edges. The preferred corrugated cardboard version links panels by intermittent tabs inserted into corresponding slots in adjacent panels and after being connected together form the frustrum of a pyramid. The tabs or the peri-slot areas may include adhesive, such as a covered strip of contact adhesive. A cover, perhaps a plate-like area, is placed over the open top. Molloy's invention is typical of many similar examples from the patent literature that are assembled from flat, rigid, straight-sided panels joined together. O'Toole (U.S. Pat. No. 4,064,662) describes a collapsible rigid tetrahedral lodgment structure based on triangular panels which can fold and bifurcate down to about a quarter of the area of a flattened panel as used. They are preferably made of a corrugated cardboard. Zsolt (WO2012079165) describes a pyramidal "tent" made from four triangular panels connected along longitudinal fold lines that had been stored flat. Adhesive tapes are optionally applied (p 13). Song (KR101350675) describes a multi-function foldable tent made from multiple trapezoidal panels of a synthetic resin, connected along folds by cloth or synthetic resin.

OBJECT

An object of the present application is to provide an improved light weight, stackable shelter; more particularly one that is adapted to fold into a flattened space for storage or transport, and then to be unfolded for use as a relatively spacious dwelling, or at least to provide the public with a useful choice.

SUMMARY OF INVENTION

In a first broad aspect the invention provides a foldable frameless temporary dwelling comprised of a radial array of inter-connected shaped side panels capable of being unfolded for use, wherein the side panels are comprised of a rigid and durable sheet material capable of being bent into a curved shape; each side panel shares a common side edge with each adjacent side panel and is joined to the adjacent side panel at a foldable joint comprised of a flexible yet inextensible fastening means, originally fixed in place between the edges of the panels and connecting the edges together when the common edges are aligned parallel and overlaid; at least one side edge of each side panel shares a common edge profile with each adjacent panel and at least a portion of each side panel is capable of flexing into the curved shape during and after an unfolding process in response to a tension thereby developed across the fastening means as a result of flexion along the or each curved joint and passed between the panels thereby causing each unfolded panel to adopt an at least partially curved configuration that encloses the dwelling.

In a related aspect, each side panel has a shape selected from the range of: a "full panel" having a modified isosceles trapezoidal shape wherein both side edges of the shape are convexly curved along their respective lengths and the shape has an upper edge and a lower edge; a "half panel" derived from the modified isosceles trapezoidal shape by divided the shape into two halves along a straight line, and an "extended panel" comprised of a combination of a rectangular portion surmounted by either a half or a full panel.

Preferably the or each dwelling is comprised of at least two full panels and at least one pair of half panels—providing a three-sided dwelling as a minimum.

In one example option, the dwelling is 2.7 meters high, the maximum width of any one full panels is 2.3 meters, and the curved edges are constructed as the arc of a circle having a radius of 3.17 meters, centered at a location 1.97 meters from a midpoint of the full panel and 0.2 meters above the lower edge produced outward.

Preferably an apical cap for the dwelling is adapted to be received on the upper edges of the array of panels thereby closing an upper aperture.

In a related aspect, the apical cap includes at least one receiving means for receiving at least one guy rope, and includes at least one closable ventilation means.

In another aspect, the flexible yet inextensible fastening means comprises an adhesive tape reinforced with a woven inextensible fabric.

Optionally the flexible yet inextensible fastening means comprises at least one length of an extrusion of a plastics material including a linear hinge joining two open sides each capable of receiving an edge of a wall panel and of retaining the edge.

Alternatively the flexible yet inextensible fastening means comprises a sprayed layer of a polyurethane coating sprayed over adjacent, parallel edges of two adjacent panel while closed and bridging the gap between the two edges.

In a further aspect, at least one side panel includes an aperture for ingress or egress.

Preferably the side panel includes an aperture for a slidable door further includes means to allow the door to slide and be secured.

In a subsidiary aspect, the rigid yet durable panel material capable of being bent is comprised of a rigid foam centre covered by an adhesive protective layer and has been cut into a curved edge profile from a flat stock.

In an alternative aspect, the panel comprised of rigid yet durable material capable of being bent is comprised of a rigid foam and has been moulded into shape from granules inside a mould adapted to create a curved edge profile and adapted to impose a curved surface on the panel.

In a second broad aspect the invention provides a moulding method for making panels for a dwelling as claimed in claim 1 characterised in that the panels are moulded from two-part mixtures as follows:
coating the interior of an opened flat or curved mould with release agent,
spraying a polyurea skin including optional protective materials inside the mould so that the surfaces of each mould surface are suitably coated,
closing the mould, and
injecting a polyurethane foam-generating mass into the mould and waiting about 5 minutes for the mass to set before removing the panel.

PREFERRED EMBODIMENT

The description of the invention to be provided herein is given purely by way of example and is not to be taken in any way as limiting the scope or extent of the invention. In particular the dimensions shown in one illustration are purely illustrative.

Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps. Each document, reference, patent application or patent cited in this text is expressly incorporated herein in their entirety by reference. Reference to cited material or information cited in the text should not be understood as a concession that the material or information was part of the common general knowledge or was known in New Zealand or in any other country.

INTRODUCTION

The replicated, curved side wall panels are a characteristic of this invention, providing more "standing height" inside the frameless structure or dwelling for a given quantity of material and for a given floor area than would be obtained from a prior-art flat-walled pyramidical structure. This invention uses panels for which opposing side edges have outwardly directed curves. Pairs of panel edges are attached while folded and flattened to adjoining panels using a foldable flexible edge fastener. Then, when any pair of panels having a shared curved hinge line is opened out along by perhaps 45, 60, 90 or 120 degrees, as set by the number of side panels in use, tension arising in the fastener tends to cause the originally flat panels to become deformed into curved panels which remain bound to each other by the fastener. Sometimes the panels have been moulded in a curved shape, then shipped when flattened.

Materials: Panels

References to any Figure numbers are made in the Materials section.

Each sector of any of these shelters may be made from rigid yet bendable plastics, or a cardboard, and held in a curve by the fastening means. The rigid sheets of this invention have limited flexibility so that an initially flat sheet can be bent without breaking during the expanding process to a curve having a radius of typically about 2.5 meters. One option for a panel construction material comprises single sheets or panels of polystyrene foam, of moderate to high density, and preferably about 10 to 30 mm thick; more preferably 20 to 25 mm thick, and most preferably 25 mm thick. Sheets may have been moulded into shapes or cut from sheet material. The "R" value for insulation of that 25 mm panel is about 0.6, whereas the "R" value for the preferred 25 mm thick polyurethane panel is about 3. Each sheet 106, 107*a*, 107*b* may be covered on the outside and preferably also on the inside 109, 111 by an added skin comprised of a woven polyethylene fibre mat, coated on one side with a latex adhesive that is compatible with the polystyrene foam. Preferably the mat includes protectants against degradation caused by ultraviolet light. A stronger structure may be made by gluing two thinner layers of foam together using a latex or similar, compatible adhesive so that cracks cannot easily propagate through the entire wall sheet.

The skin confers a useful tensile strength on the surface of the sheet material and protects it from weather and impacts. The tensile strength is used to hold the structure in an opened or expanded form and the stresses caused in the walls (as a result of bending into the curved shape shown in FIGS. 1, 2, 4, 6 and 7) that were imposed at the time of erection provide additional strength. Since the walls are held in tension and at the same time are held in curved profiles they have greater strength against deflection by for example wind than flat walls would have, and will seem to be more secure. The entire wall structure of one shelter made in polystyrene foam weighs approximately 22 kg.

A twin-layered polyethylene sheet as used in horticulture and for sign boards, commonly including a corrugated centre, is an option.

A more preferred option for a panel construction material comprises single sheets or panels of a polyurethane foam in which the shape is moulded into a curve and is produced by:
(1) coating the interior of an opened mould with release agent,
(2) spraying a polyurea skin (typically a quick-setting two-pot mixture) and optionally coloring or protective materials inside the mould so that the surfaces of each panel are suitably coated,
(3) closing the mould, and
(4) injecting a polyurethane foam-generating mass (also typically a quick-setting two-pot mixture) into the mould and waiting about 5 minutes for the mass to set.

A rotatable carousel of perhaps 6 moulds might be used in one production line. The 5-minute cycle time is appropriate for the materials described. A four-sided shelter also has 6 panels, so any one mould may be provided with doorway or window inclusions, or gutters for collecting water.

With the moulding option, the panel thickness and panel outline is controlled; overcoming waste if panels are cut from sheet material. It is possible to build in an inherent curve along the length of each panel by including a desired curve in the mould. The inherent curve may be less sharply curved than that of the finally assembled panel in an unfolded shelter. As a result, tensions developed between upper parts of the edges of adjoining sheets in an opened-out shelter are not as great and longer life can be expected. The inherent curve of any) curve can be flattened out again by strapping or the like for storage and transport as a flat item.

If the polyurea skin was not applied inside the mould, the sheets may be protected against abrasion and against ingress of moisture—from either the outside or the inside, or both—by spraying one or more coats of a fast-setting elastomer over the surfaces after assembly, including the joints. At the time of filing, a preferred coating elastomer is a polyurea; more preferably an aromatic polyurea, including as a sprayable mixture containing (without limitation) amine-terminated polyether resins, amine chain extenders and prepolymers in a two-part mixture to be mixed together before being sprayed on to a surface to receive treatment. One suitable commercial product is "Polyshield HT™" available from Specialty Products Inc, Lakewood, Wash. 98499, USA. It is noted that this product has been recommended to be used where weathering from the sun cannot occur, and this product will change colour and become degraded by sunlight over time. Despite this recommendation, the product sheet for the aromatic polyurea coating claims a weatherability of 3000 hours by the QUV accelerated test method. Emergency housing according to this invention is likely to be exposed to the sun when in use, but on the other hand the intention is to provide low-cost temporary shelters only. A longer-lasting coating comprises an elastomeric coating comprised of aliphatic urea or polyurea or similar coating compositions, also from Specialty Products Inc., or others.

Other ways include adding an ultraviolet-absorbing organic material as a sunblock such as (but not limited to) 4-aminobenzoic acid (para-amino-benzoic acid) in the outer coating, or mixing in carbon black, or another pigment, or aluminium foil.

Since candles, cooking fires or other flames might be used inside, even if their use is forbidden, it may be useful to include fire-resistant materials in the construction material so that the panel material, including urethane, does not burn. Sometimes the shelters are not intended to be taken down, packed and transported to another site, but they may survive one use of habitation and be moved elsewhere. A compromise is made between durability and cost.

Figure 3A:
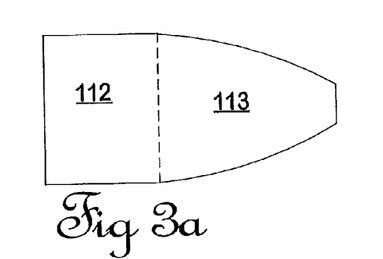
FIG. 3a: shows an extended panel having a rectangular, lower portion and a curved portion.
Figure 3B:
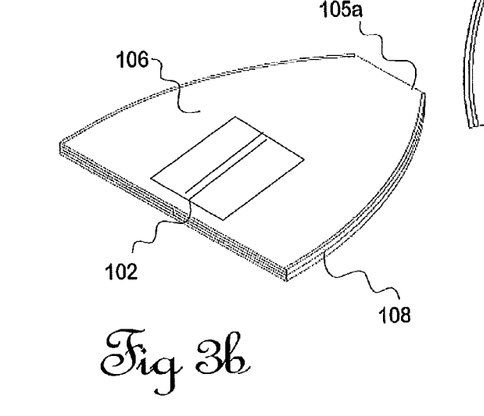
FIG. 3b: shows a fully folded shelter of the type shown in FIG. 1, ready for storage or transport, in which all the intended curved sides are lying flat and in contact with each other.

The shape of each full side panel may be described as a modified isosceles trapezoidal shape wherein both sides of the shape are convexly curved and optionally comprise arcs of a circle along their respective lengths. FIG. 3*b* is a perspective view of panels 106 folded into a flat configuration. The top edge 105*a* receives the apical cap. Half-panels are the same but split vertically into two halves by a straight line. FIG. 3*a* shows a combination of a rectangular portion 112, surmounted by a modified isosceles trapezoidal shape 113, to be curved when installed. This option may have a further option in which portion 112 of the side panel receives a series of aligned pleats or corrugations during moulding.

It should be noted that present-day preferences for named plastics or other panel materials may change over the life of the patent, when other suitable options become available, or cheaper, or develop other advantages.

Materials: Inter-Panel Fastener Options

Several ways to form durable and flexible attachments between an edge of one sheet and an edge of an adjacent sheet exist.

Tape:

One option is an adhesive tape 501 preferably a including reinforcing fibre. The tape is applied to bridge between the edge of one sheet and an edge of a mated pair of sheets along their adjacent straight or curved edges, when in folded-together orientation, in order to create a shelter as described below when opened out. Strips of an adhesive-coated woven polyethylene fibre mat applied as an optional skin may be used to additionally cover the joins of adhesive tape. It has been noted that the adhesive tape is relatively time-consuming and difficult to attach manually, yet may be useful in particular parts of a set of installed dwellings and related buildings. Stitching may be used as a field repair to lengthen the life of a taped joint.

Figures 15, 16:
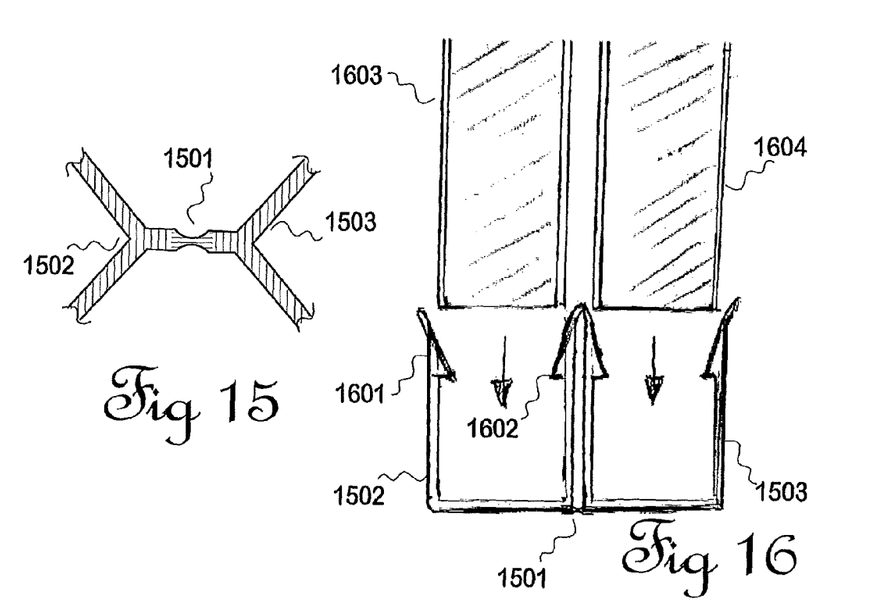
FIG. 15 is a section showing detail of an Example 5 plastics hinge.
FIG. 16 is a section through an Example 5 extrusion, about to receive parts of a shelter wall.
Figure 17:
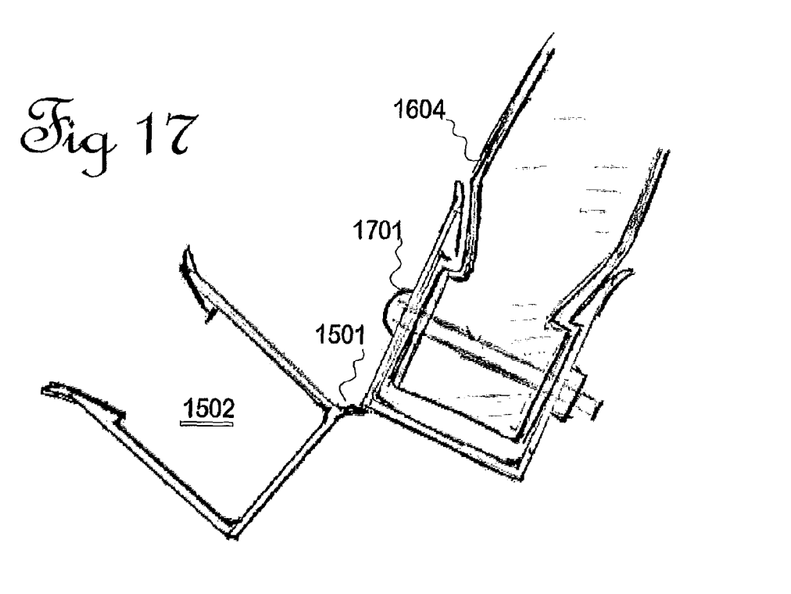
FIG. 17 is a section through a partly unfolded shelter wall (one wall section included).

Foldable Extrusion:

The elongate hinge material of Example 4 (see FIGS. 15, 16 and 17) employs a specially designed extrusion of a relatively flexible plastics material that includes a foldable seam. Preferably, the foldable seam at least is extruded from polypropylene (PPE) or similar materials, since that plastics material is known to be suitable for hinges. (Co-moulding may be used). Optionally, the extrusion is formed from a mould without a thinned hinge area. Then, while still soft, the extrusion is fed between a pair of narrow rollers that compress the hinge sideways, thin the hinge, and may also cool it. The molecules of polymer undergo a preferential elongation sideways when the soft plastic becomes deformed and flows. As a result the molecules become at least partially aligned across the hinge, FIG. 15 shows a cross-section of a hinge of this type. 1501 is the area thinned by rolling. 1502 and 1503 indicate inner corners of two open rectangular profiles, also formed as part of the extrusion (see FIGS. 16 and 17). The width across each rectangle is selected in relation to the thickness and deformability of the panels used, and to the "grip" of the barbs. 1502 is provided with barbed (in cross-section) edges as shown at 1601 and 1602 that will tend to retain the panel edges 1603 and 1604 when thrust into the opened aspects of the extrusion during assembly, as suggested in FIG. 16. (This act could be carried out at a site rather than in a factory, if convenient). The barbed ends will form a groove in the semi soft surface of the panel to create the rebate. FIG. 17 shows a partially unfolded hinge with one of the two sides occupied by a plastics sheet. FIG. 17 also includes a section through one retainer or fastener 1701, that is an option for use in order to more reliably maintain the assembled sheets and the extrusions in place and prevent them from being pulled apart, even if tension. Stitching may be used to lengthen the life of an extruded joint.

Sprayed-On Joint:

Polyurea is a preferred elastomer, such as an aromatic polyurea, including sprayable mixtures containing (without limitation) amine-terminated polyether resins, amine chain extenders and prepolymers in a two-part mixture to be mixed together before use. As a more long-lasting alternative, aliphatic urea or polyurea or the like coating compositions may be considered.

Figure 5A:
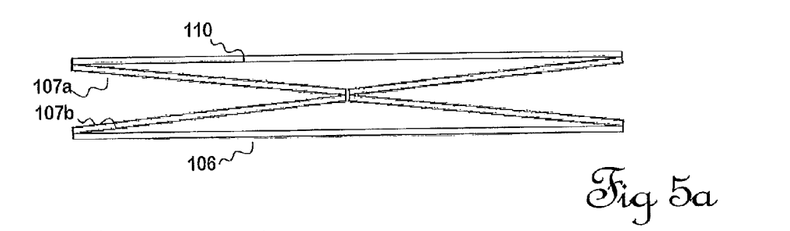
FIG. 5a: is a cross-section in a horizontal plane of a partially unfolded shelter.
Figures 5B, 5C:
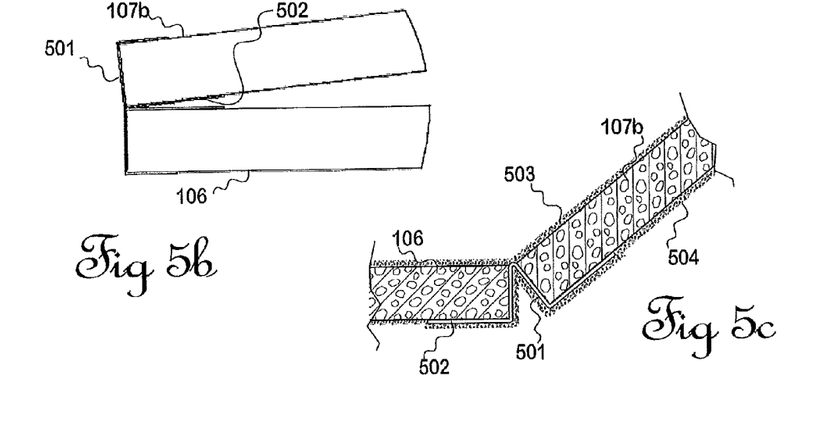
FIG. 5b: is a detailed cross-section of a joint.
FIG. 5c: is a detailed cross-section including a spray-deposited coating.

FIG. 5c shows in cross-section an example of the coating when applied over both sides of each sheet making up the shelter and across a joint between the sheets. 106 and 107b are the adjoining sheets. FIG. 5c includes a section through a join between one panel 106 and the other, adjoining panel 107b). It has surprisingly been found that the elastomer coating is capable of replacing the adhesive tape previously described. Application of that tape is labour-intensive, so deleting the tape reduces the cost of the dwellings. The panels are shown coated with the elastomeric coating of polyurea on the inside and on the outside of the panels as 503 and 504. The coating 504 is first applied to the joint when it is folded as shown in FIG. 5b. The second side coating 503, which is optional, is applied when the joint is opened, as in FIG. 5c. More than one layer may be applied. "Würth" brand KD BOND PLUS seal (Würth Australia Pty Ltd; Healey Rd Dandenong, VIC 3175 Australia) is an example polyurea spray. It may also be applied on to and over a fibre tape (represented as 501, 502 in FIG. 5c) in order to make a composite material, or over the previously described adhesive tape.

Materials: Other Parts

Floor:

Any floor may be used. For example, no floor may be best for tropical conditions, or a fireproof substance such as bricks, concrete or gravel, or a carpet, to a thick layer of a thermal insulation for use upon frozen ground. The floor may not embody the mechanical attributes of the folding wall structure to be described below. One preferred example floor comprises one or a pair of sheets of plywood, laid upon a layer of foam plastic. The plywood serves to distribute a point load such as from a heel of a shoe, or an item of furniture, without damage. See below for details, with reference to FIG. 12.

Figure 12:
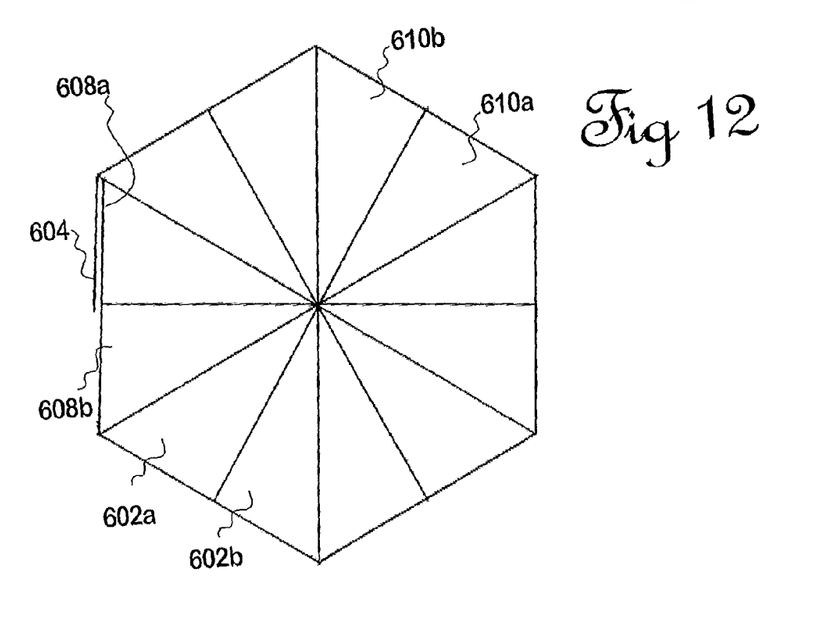
FIG. 12 is a floor plan of the twelve-sided shelter.

The shelter base 601 may lie on the ground below, be pegged to the ground, or be completed by an unfolded floor panel fixed on to the sectors at the time of assembly, configured like FIG. 12. The floor panel 610 might be comprised of a single piece of sheet material, might be made of quadrants or smaller sectors, or might not be installed at all, depending on conditions. Weatherproofing requirements may dictate how the floor is supported from the ground and whether draining is provided.

There is no provided window, although one could be made by cutting a hole through the wall opposite the door and sticking a clear or translucent sheet over the hole using adhesive tape.

Figure 1:
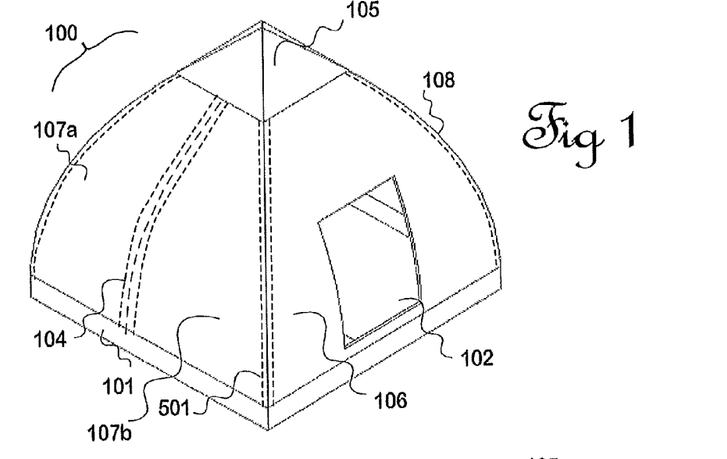
FIG. 1: shows an assembled shelter according to the invention as a square-based shape having inwardly curved walls terminating at a peak; a door and a separate, optional floor.
Figure 7:
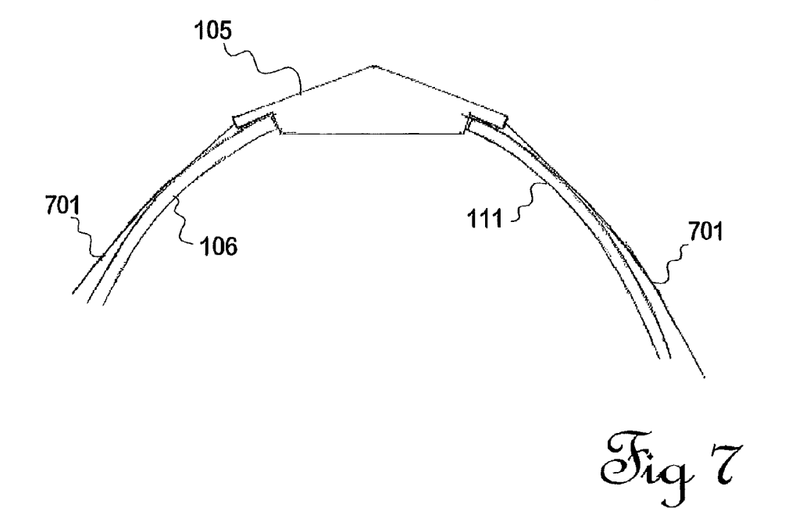
FIG. 7 shows a cap in place, in cross-section.

Cap:

An apical cap 105, 603 which may serve as a ventilation aperture or as a seal against rain covers the space above the upper truncated panel edges. The cap covers the intersection of the truncated higher ends of all the sectors. In one version the round and slightly conical cap is able to be lifted off the top of the shelter from time to time, to provide a ventilation aperture. In another, the cap is fixed in place and includes an openable ventilator. The cap 105 shown in FIGS. 1 and 7 is typically a rotationally moulded double-skinned cap having steps around the lower perimeter in order to become locked to the upper edges of the curved sheets forming the walls such as 106 and 111. The cap and therefore the entire shelter beneath can be secured by being tied down to the ground by guy ropes 701 passed through drilled holes. Securing the cap to the ground may be of particular use in a windy area for preventing the shelter from being blown away, because the cap serves to distribute the tension in the guy ropes which are likely to rupture the foam sheet if brought to an attachment point. Use of a double skin for the cap helps to minimise condensation. The cap can be made in a translucent material in order to serve as a sky light. Or, it may include a black layer and serve as an evaporator in a water distillation plant.

Three-Sided Shelter

Although a three-sided shelter having curved edge profiles according to the invention is possible, with two full side panels and one made of two jointed halves, the inventor considers it to be an inefficient variant in terms of enclosed volume for a given amount of material.

Four-Sided Shelter

See FIGS. 1 to 7. FIG. 1 shows an assembled four-sided shelter 100 having a square base 101 and four curved walls (side wall 104 and end wall 106 are visible here) terminating at a peak 105. Each side of the square base is typically 2 to 3 meters long; in one example 2.3 meters long. A preferred size may be imposed by raw sheet size or by restricted transport spaces, such as container internal width. The shelter has a door 102, and a separate and optional floor 101. A window could be made in the sheet 110 opposite the door and fitted with a transparent material, or the occupants might make the opening later. Ventilation may be provided though a apical cap 105. The shelter could be made with three panels (of which one is a two-part panel), although a shelter having four or more panels is preferred over three.

Figure 2:
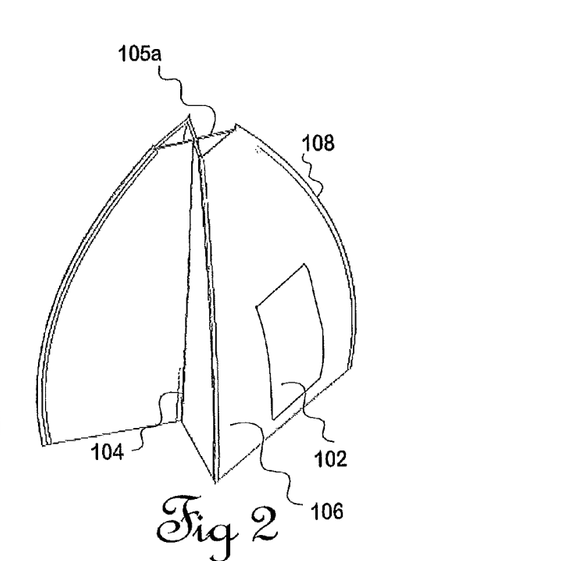
FIG. 2: shows a partially unfolded shelter, in which the end walls (one including door 102) are less sharply curved and in which the side walls 107 are being unfolded along join 104.

As shown in FIGS. 1, 2, 3, 4 and 5a-c, the preferred construction for a four-sided shelter includes two broad panels 106 with convex curves along both edges, and two pairs of half-panels 107, that have a matching curve along one edge and a straight edge between base and apex on the other side, allowing for folding the half-panels together as shown in FIG. 2. The shelter is made and shipped with the aligned sides joined together by a firmly adherent and flexible fastening means 108, 502, 806, or 1502/1503. It is inherent in this design that the curved jointed edges, joined with a flexible adherent fastener, will force the side walls to adopt a curved surface when the assembly is unfolded. The unfolded shelter has extra interior space as a result of adopting the curved surfaces. Note that the curved planes of the curved walls may be dictated solely by tensions developed in the inter-panel joints along curved edges, or the planes may be partly or completely curved as a result of moulding.

Note that when in a flattened form the shelter walls comprise a compact stack of flat sheets 106 all of which have the same curved edge profile (108 in FIG. 3b). One advantage is that the edges tend to protect each other from impacts. As shown in the partly expanded horizontal-plane cross-section in FIG. 5a, two full-width sheets (106, 110) are separated on each edge by two half-width sheets (107a, 107b) so there are 6 panels in one flat 4-sided shelter kit.

In FIG. 1 the door structure 102 may be a roll of a textile or other woven material suspended from above the door. It may be the part of the sheet that was cut out during manufacture.

FIG. 2: shows a partially unfolded shelter, in which the end walls (one including door 102) are less sharply curved and in which the side walls 107 are being unfolded along join 104. This drawing shows how the structure acquires a floor area as a result of an unfolding concertina effect. During opening, the corners (such as 108) impose an increasing bend on the originally flat sides as a result of the adhesive tapes joining the sheets across the curved edges maintaining their adhesion on the wall surfaces while bending, but without significant stretching. Hence the sides become more strongly curved and acquire the extra strength of curved surfaces. Since the walls are held in tension and at the same time in curved profiles they have greater strength against deflection by for example wind than flat walls would have. FIG. 5a is a section in a horizontal plane of the structure being unfolded. Note the concertina folds of walls 107a and 107b, and 109a with 109b.

FIG. 5b has detail of the adhesive tape 502 on the inside of the joint, with 501 indicating an extra protective layer as described elsewhere in this section, applied over the otherwise exposed foam plastic of the wall.

FIG. 3b: shows a fully folded shelter, ready for storage or transport, in which all the eventually curved sides are lying flat. Note that the edges (108, 108a, 108b) are curved and the adhesive tape covering the folds has been pre-applied. The side seams (104 and its opposite) are visible through the door aperture 102. This configuration is suitable for transport by truck or airplane to a remote site. Note that there are no poles, tent pegs or guy ropes, although the cap may be tied to the ground with one or more guy ropes to hold the shelter down.

Figure 4:
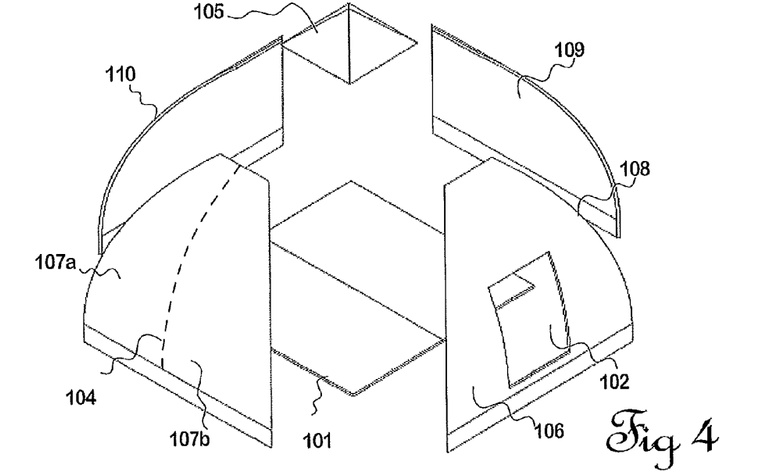
FIG. 4: shows an "exploded" shelter, in which various components are separated.

FIG. 4: shows an "exploded" shelter, in which various components are separated. The floor 101 is shown as two adjoining parts. This view shows the end wall 110 remote from the door 102, and the right side wall comprised of two parts 109a and 109b separated by joint 104b. (See FIG. 5a). Joints 104a and 104b are along straight lines.

Figure 6:
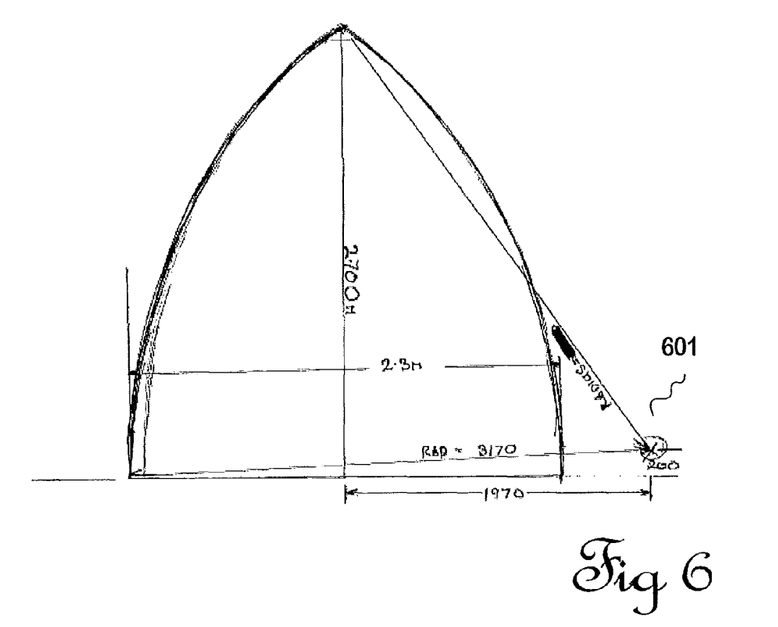
FIG. 6: shows some of the geometrical relationships involved in construction.

FIG. 6: shows some of the geometrical relationships, in one cross-sectioned example. All the curved edges of the walls are cut so as to have a part-circular edge at the same radius as each other, with parallel edges, so that they may fold or unfold while maintaining parallel, curved adjacent edges. The centre of the circle defining a part-circular edge s placed in the indicated position 601. For the example shown in which each side is 2.3 meters long, an imaginary circle centre 601 situated 1.970 meters from the midline of the shelter, and 0.2 meters up from a line projected from the base, and with a radius of 3.170 meters, is used to determine the profiles. The numbers provided here were obtained by experimentation. A reasonably gentle circle is preferred in order to optimise the internal space (headroom) and the amount of bending imposed on the sheets. It is useful to stay within the dimensions of available sheet material, and to bear in mind transport size restrictions. The inventor prefers that the most apical ends (for about 25 cm) of the curved sides are straight, so that the tensions across the joints do not increase markedly.

Six-Sided Shelter

Figure 8:
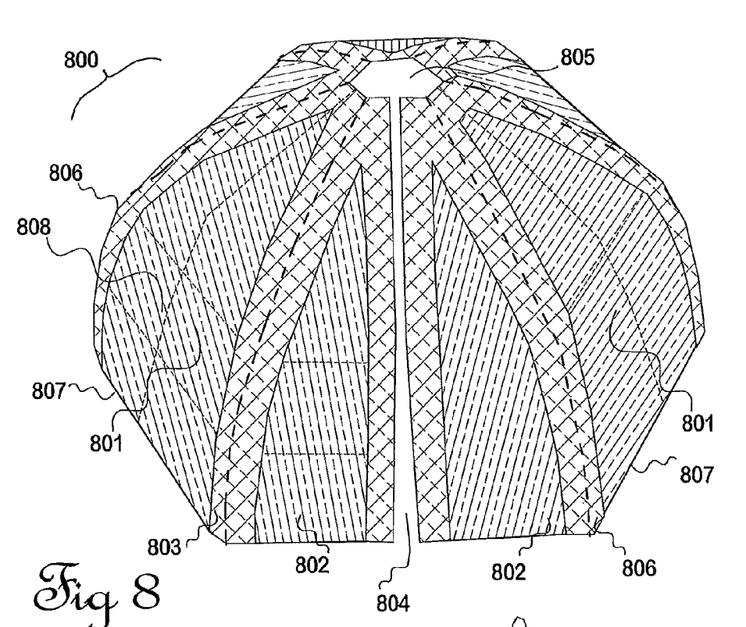
FIG. 8 is a perspective drawing of a six-sided shelter, assembled.

FIG. 8 is a perspective drawing of a six-sided shelter 800 erected and ready for use as a shelter. FIG. 8 shows two full walls 801, and two half-width walls that are on each side of an entrance 804. There is an aperture 805 through the roof. All wall sections, which are sufficiently flexible to permit being bent into the inwardly curved shape as shown, are adhered together with adhesive tape 803, 806, as per Example 1. Dotted lines 808 shows folds which are held internally with tape and have been unfolded in the outward direction down the middle of each panel 801.

Figure 9:
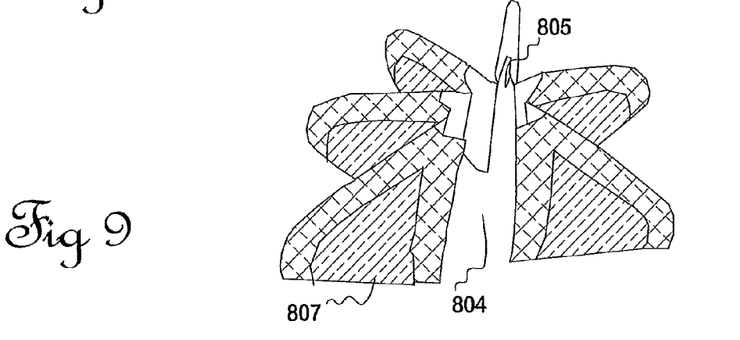
FIG. 9 represents a six-sided shelter, partially unfolded.
Figure 10:
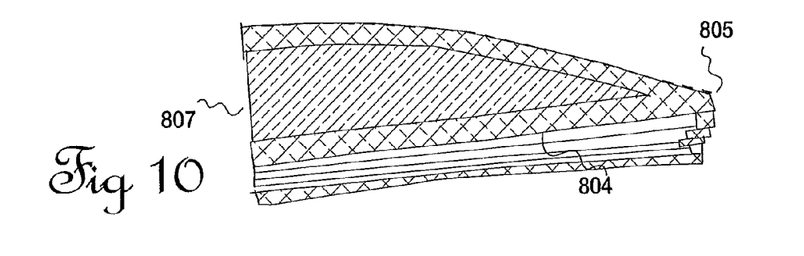
FIG. 10 is a perspective drawing of a six-sided shelter, in flat pack form.

FIG. 9 represents a six-sided shelter, partially unfolded. It is adapted from a photograph of a model prototype. The erection process is briefly the steps of: choosing a preferably flat floor site and perhaps making a drainage trench around the floor area, opening the packed shelter (as shown in flat pack form in FIG. 10), standing it on the base end 807, and pulling the individual sides apart, accordion-style, around a circular path so as to pass through the stage shown in FIG. 9 and then to push the re-entrant joints outward until each of the 5 complete walls and one paired entrance walls (panels 802, 802 on each side of a doorway or final closure seam 804) are approximately flat across, as shown in FIG. 8. The flat pack of FIG. 10 shows that one side of the flat pack (804) is straight—and becomes the seams like 808—and one side is curved and becomes the corners like 806.

Polygonal Shelter

This polygonal shelter 600 (FIGS. 11, 12, 13 and 14) is about 3 meters high. A series of sectors, each comprising a flat or unidirectionally curved shape split up the middle (for example the pairs 602a, 602b, or 610a, 610b in FIG. 12) each has an outline tapering from a flat base 601 to a narrow top, are assembled into a shelter by attaching the edge of one sector to the edge of an adjacent sector with a flexible binding strip 501.

Pairs of curved edges (such as the pair between 602b and 608b in FIG. 13) are attached together when folded through 180 degrees and lying flat.

Figure 11:
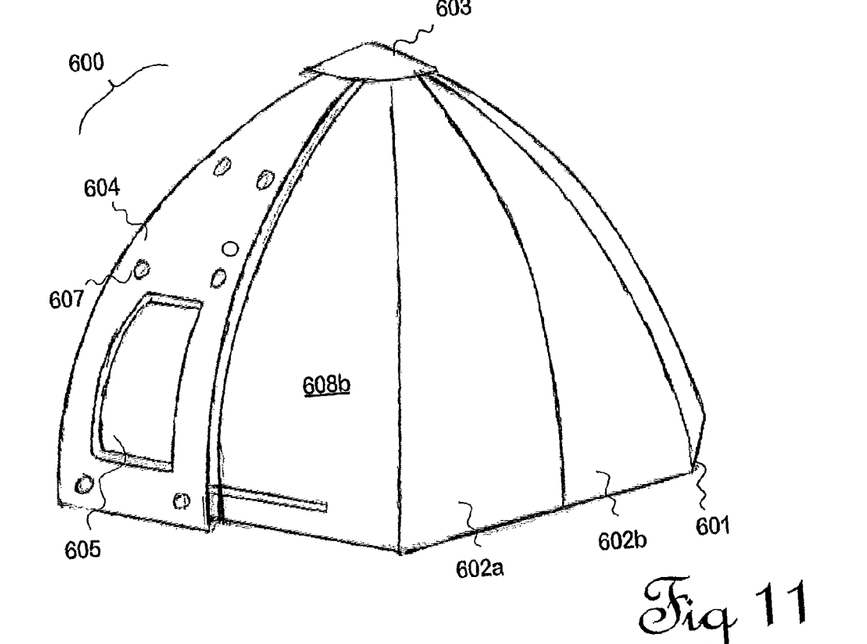
FIG. 11 is a perspective drawing of a twelve-sided shelter for which each panel is curved.
Figure 13:
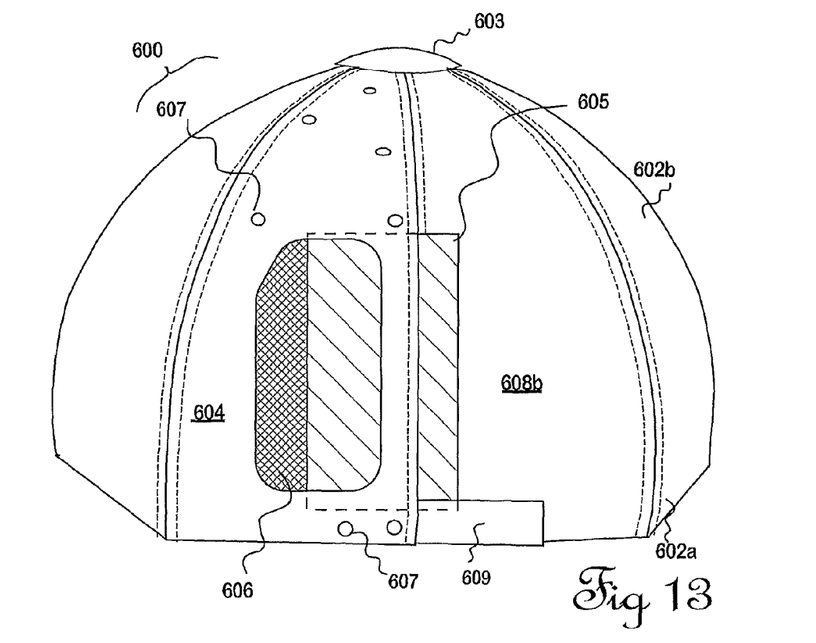
FIG. 13 is a perspective drawing of a twelve-sided shelter; the sliding door is partly open.
Figure 14:
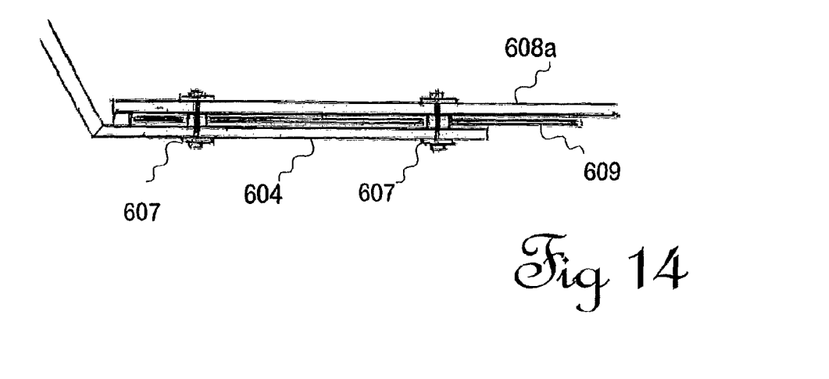
FIG. 14 is a horizontal section through a sliding door in place.

Note that in FIG. 11, that same set of curved edges appears straight because of the viewing aspect. Pairs of straight edges, such as that on the left side of panel 608b in FIG. 13 are also attached together when folded through 180 degrees and lying flat. The preferred joint flexibility allows the shelter to assume a hemispherical shape when the as-stored zigzag is unfolded, while the flexible binding strip maintains the curved edge pairs, and the straight edge pairs, with adjacent edges. Although FIG. 11 shows a domed shape made from evenly curved shapes it would be possible to cut the edges with a lower straight part and an upper curved part so that there is more standing room inside. In that option the straight portions would not possess the strength imparted by the curve, unless corrugated grooves aligned vertically, or an equivalent, are moulded in.

The shelter base 601 may lie on the ground below, be pegged to the ground, be simply not used, or be completed by an unfolded floor panel fixed on to the sectors at the time of assembly. The floor panel 610 (FIG. 12) might be comprised of a single piece of sheet material, might be made of quadrants or smaller sectors, or might not be installed at all, depending on conditions. Weatherproofing requirements may dictate how the floor is supported from the ground and whether drains are provided.

One advantage of the polygonal shelter is that the shelter may be stored or transported in a folded, flat configuration in a zig-zag folded shape with the sectors already attached except that, as stored, the two free edges of the assembled shelter are not attached. On installation the shelter is expanded to securely enclose a volume by bringing the two free ends 604, and (608*a* with 608*b*) of the formerly folded set of sectors together at a doorway assembly around door 606. Note that the shelter floor layout as shown in FIG. 12 includes an overlap where the two sectors 604 and 608 meet from opposite sides at door aperture 606. The improved doorway assembly is comprised of an inner panel sector 608*a* (see FIGS. 12 and 14), separated by spacers 607 from an overlapping outer sector 604. The spacers hold the overlapping panels apart so that a sliding doorway, comprised of a separate curved sheet of plastic 605 wide enough to close the space 606 when drawn to the left (with reference to FIG. 13) while running on a channel of plastics material has room to slide. When the door is moved to the right, the aligned apertures that had been cut into the first 604 and last sectors 608*a* of the shelter at the time of manufacture provide access to the interior. Fasteners such as 607 comprise a pair of discs in order to spread any applied stress, with a rod extending from the centre of one disc and a tube extending from the centre of the other disc, wherein the rod and tube are moulded to have a ratchet so that when pressed together through the thickness of two sectors the two parts become locked together. Preferably the rod is long enough to pass through an intermediate collar used to maintain an intermediate space between the two sectors so that the door can slide in the intervening space. See FIG. 14. The same design can be scaled down to provide a window assembly elsewhere on the shelter although at only one part of the periphery is there a need to close the circle.

A resulting shelter is shown in FIGS. 11-14 wherein an overall ground plan of hexagonal outline 600 is comprised of pairs of adjoining sectors. Each pair (such as panels 605 and 608 in FIG. 12 shares a common curve. The straight line portion in between 602*a* and 602*b*, or 610*a* and 610*b* also comprises a taped, jointed edge between the two parts of one pair. A complete shelter kit is prepared for storage or shipping by folding all the panels into a zig-zag configuration, and packaging together with a roof cap 603, fixers 607, a door 605, and a door slide channel.

This invention is optimised to provide cheap, low-cost, easily transported housing for transient populations such as refugees from natural disasters, famine or war. The maximum width of the folded package is just under 1.2 meters so that many packages can be packed two-across inside a container. The overall density of the package is low, so that it may be feasible to drop packages on to a disaster area with minimal damage from the hinged loading ramp of a low-flying cargo aircraft such as a Lockheed Hercules C-130 which can be flown as slow as 130 km/hr at a drop zone. The curved panels provide inherent strength and the shelter can be unfolded and erected and will stay intact even in a strong wind while the cap can be used to terminate guy ropes anchored into the ground.

Variations

To become a permanent dwelling, a shelter comprised of curved panels as described may optionally be coated with concrete and reinforcing material at some date after installation. The curved panel shapes will withstand the weight of for example 50 mm of fibrous concrete better than flat panels could. After hardening, the inherent waterproof and thermal insulative properties of the panels under the concrete overcome the perceived cold and damp nature of uncoated concrete. Openings for the door, the window and the roof cap are preserved by constructing temporary shields or tunnels that prevent the wet concrete from travelling into them. The roof cap may be converted into a chimney. The shelter may be cloaked in turf or other available materials.

Advantages

The various embodiments of the invention provides a medium-technology solution to provision of emergency shelter housing. Although one ideal would be to use natural materials, it is best to make use of technological developments since the limiting constraints include "low cost" and "low transport cost". It would be possible to house many persons from 30 shelters that had been stored flat inside a 40 foot container. It may be possible to air-drop pallets loaded with many individual folded huts at a disaster area, where their light weight helps during ground impact, if unassisted.

Advantages of the curved walls created by the adherent curved edges include that the interior space is larger and has a higher average height, that more efficient use of ground area is made, and that the panels, being curved and under tension, have increased stiffness. They will not vibrate in the wind.

Advantages of a six-cornered shelter such as in FIGS. 8-10 over a three- or four-cornered version include that the space inside is more optimised for a given mass of shelter; where the ideal is a sphere, having the highest volume to surface area ratio). The six-cornered folded-together flat pack has a narrower width perhaps about 1.2 meters, which makes transport more convenient. An eight-cornered, or a five-cornered variant (or other variants on 4 or 6 corners) may be considered, depending on optimisation of materials, weight, and durability of the adhesive tape and surface coatings.

Finally it will be understood that the scope of this invention as described and/or illustrated herein is not limited to the specified embodiments. Those of skill will appreciate that various modifications, additions, known equivalents, and substitutions are possible without departing from the scope and spirit of the invention as set forth.

I claim:

1. A foldable frameless temporary dwelling 100 comprising:
   a radial array (106,107 *a*, 107 *b*, 110 and 109) of interconnected shaped side panels capable of being unfolded for use, characterised in that the side panels comprise a rigid and durable sheet material capable of being bent into a curved shape;

each side panel shares a common side edge with each adjacent side panel and is joined to the adjacent side panel at a foldable joint (108) that comprises at least one flexible yet inextensible fastening means (501, 806) originally fixed in place between the edges of the panels and connecting the edges together when the common edges are aligned parallel and overlaid;

at least one side edge of each side panel shares a common edge profile with each adjacent panel and at least a portion of each side panel is capable of flexing into the curved shape during and after an unfolding process in response to a tension thereby developed across the fastening means (108) as a result of flexion along the or each curved joint and passed between the panels (106, 107*a*, 107*b*, 110 and 109) thereby causing each unfolded panel to adopt an at least partially curved configuration that encloses the dwelling;

wherein at least one side panel (106) includes an aperture (102, 605) fort ingress or egress;

wherein the at least one side panel (106) includes the side panel 106, 608 *b*) including the aperture of a slidable door (609) further includes means 604, 607, 608 *a*) to allow the slidable door to slide and be secured.

2. A dwelling (100) as claimed in claim 1 characterised in that each side panel has a shape selected from the range of: a "full panel" (106) having a modified isosceles trapezoidal shape wherein both side edges of the shape are convexly curved along their respective lengths and the shape has an upper edge and a lower edge; a "half panel" (107 *a*, 107 *b*) derived from the modified isosceles trapezoidal shape by divided the shape into two halves along a straight line, and an "extended panel" comprised of a combination of a rectangular portion (112) surmounted by either a half or a full panel (113).

3. A dwelling as claimed in claim 2 characterised in that the dwelling (100) comprises at least two full panels (106, 110) and at least one pair of half panels (107 *a*, 107 *b*).

4. A dwelling as claimed in claim 3, characterised in that the dwelling is 2.7 meters high, the maximum width of any one full panels is 2.3 meters, and the curved edges are constructed as the arc of a circle having a radius of 3.17 meters, centered (601) at a location 1.97 meters from a midpoint of the full panel and 0.2 meters above the lower edge produced outward.

5. A dwelling as claimed in claim 3 characterised in that an apical cap (105, 603) for the dwelling is adapted to be received on the upper edges (105 *a*) of the array of panels (106, 111), thereby closing an upper aperture.

6. A dwelling as claimed in claim 5 characterised in that the apical cap includes at least one receiving means for receiving at least one guy rope, and includes at least one closable ventilation means.

7. A dwelling as claimed in claim 1 characterised in that, the flexible yet inextensible fastening means (108, 806) comprises an adhesive tape reinforced with a woven inextensible fabric.

8. A dwelling as claimed in claim 1 characterised in that the flexible yet inextensible fastening means comprises at least one length of an extrusion of a plastics material (1502 and 1503) including a linear hinge (1501) joining two open sides each capable of receiving an edge of a wall panel and of retaining the edge.

9. A dwelling as claimed in claim 1 characterised in that the flexible yet inextensible fastening means comprises a sprayed layer (504) of a polyurethane coating sprayed over adjacent, parallel edges of two adjacent panels (106, 107 *b*) while closed and bridging the gap between the two edges.

10. A dwelling as claimed in claim 3 characterised in that the rigid yet durable panel material capable of being bent comprises a rigid foam centre covered by an adhesive protective layer (504) and cut so as to possess a curved edge profile from a flat stock.

11. A dwelling as claimed in claim 3 characterised in that the panel comprises rigid yet durable material capable of being bent further comprises a rigid foam and is moulded into shape from granules inside a mould adapted to create a curved edge profile and adapted to impose a curved surface on the panel.

12. A dwelling as claimed in claim 1, characterised in that the dwelling is coated with concrete in order to form a permanent dwelling.

13. A method for making panels for a dwelling as claimed in claim 1 wherein the panels are moulded from two-part mixtures as follows:
   a. coating the interior of an opened flat or curved mould with release agent,
   b. spraying a polyurea skin including optional protective materials inside the mould so that the surfaces of each mould surface are suitably coated,
   c. closing the mould, and
   d. injecting a polyurethane foam-generating mass into the mould and waiting about 5 minutes for the mass to set before removing the panel.

* * * * *